March 6, 1945. F. NEAL 2,370,988
TRAILER
Filed Nov. 18, 1941 2 Sheets-Sheet 1
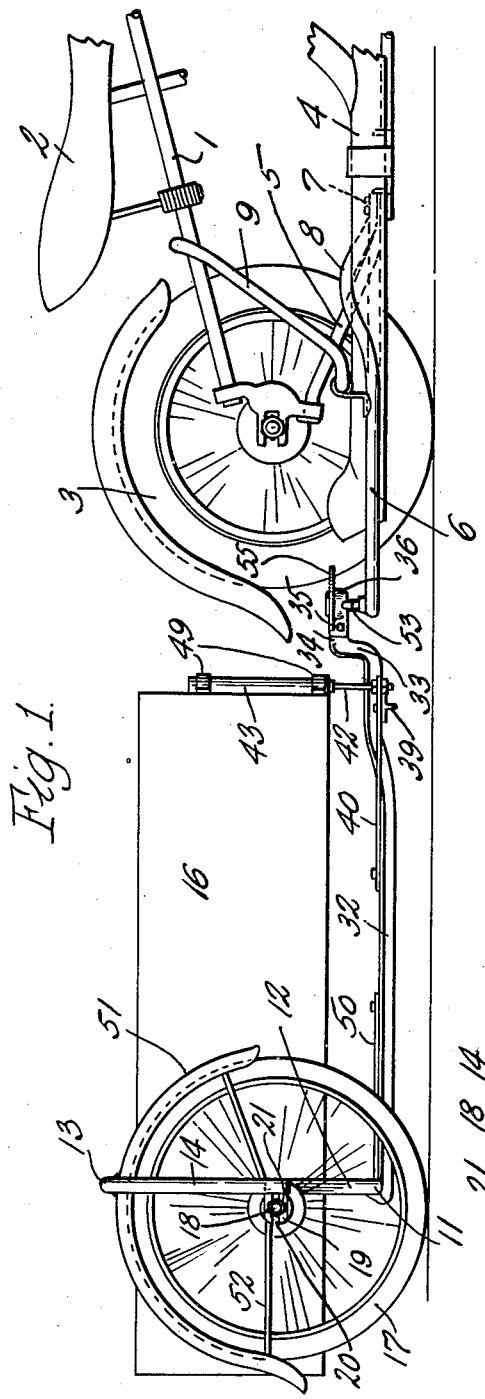
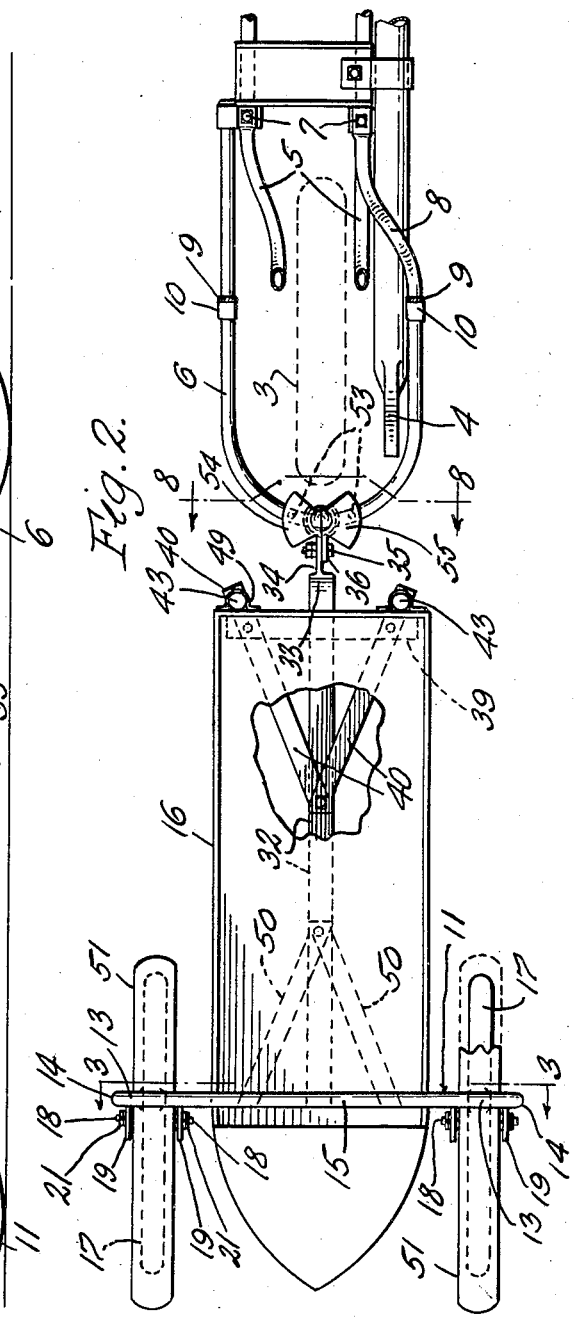
INVENTOR.
Frank Neal,
by Parker, McKnow & Farmer.
ATTORNEYS.

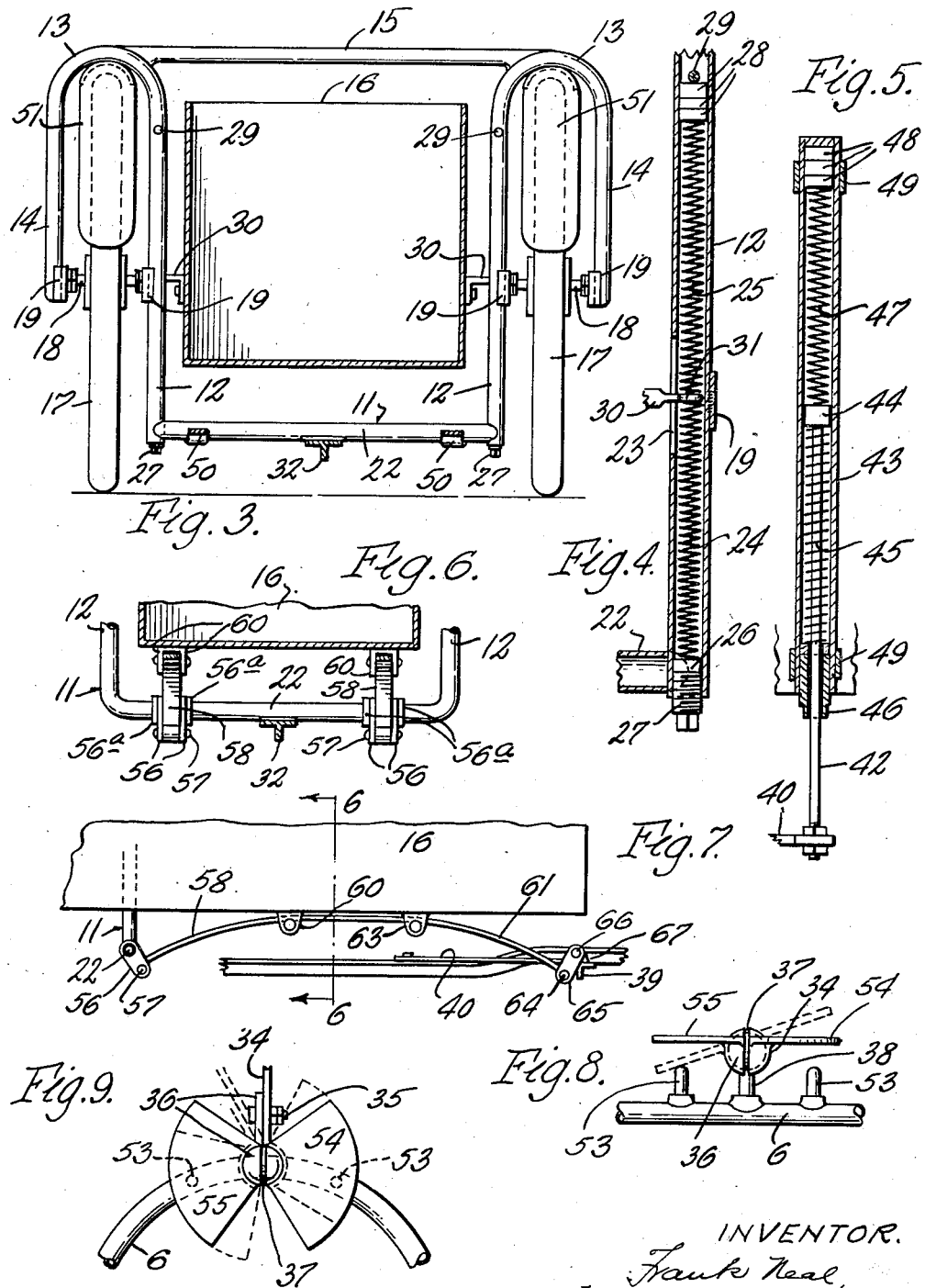

Patented Mar. 6, 1945

2,370,988

UNITED STATES PATENT OFFICE 2,370,988

TRAILER

Frank Neal, Little Valley, N. Y.

Application November 18, 1941, Serial No. 419,591

11 Claims. (Cl. 280—33.4)

This invention relates to trailers, and to couplings between trailers and tractors. More particularly it relates to two-wheeled trailers for motorcycles, and to the manner of coupling the same to a motorcycle.

An object of the invention is to provide an improved trailer for motorcycles, which will have approximately the same road clearance as a motorcycle to which it may be attached; which will have a relatively low center of gravity so as to be stable against lateral tipping when travelling over a highway at high speed; which will offer a minimum of additional wind resistance when hauled behind a motorcycle; which will employ standard wheels available in any community throughout the country for replacement in whole or in part; which will have a relatively large load capacity; which may be coupled to the frame of the motorcycle, by which it is hauled, at a relatively low point of such frame so that any lateral pull on the motorcycle due to horizontal changes in direction of travel, will exert a minimum force tending to tip the motorcycle sideways; which will interfere to a minimum extent with the normal operation of the motorcycle, and which will be relatively simple, light in weight, compact, durable and inexpensive.

Another object of the invention is to provide an improved two-wheeled trailer which will have a relatively low center of gravity both empty or loaded; with which more than half of the load may be carried by the wheels of the trailer; with which the body of the trailer will have a resilient suspension from the trailer frame; which will not greatly increase the consumption of fuel by the motorcycle which hauls it; and which may utilize standard bicycle wheels as the rolling support therefor.

Another object of the invention is to provide an improved coupling between a trailer and tractor, with which limited relative tipping of the tractor and trailer frames sidewise, or in a direction laterally of the direction of pull between the frames, may be limited to a safe degree, throughout a considerable range of horizontal and vertical movements of the frames at the coupling between them.

Another object of the invention is to provide improved means for coupling a trailer to a motorcycle, with which the drag or pull on the motorcycle will exert a minimum tendency to tip the motorcycle sidewise.

Other objects and advantages of the invention will appear from the following description of some embodiments thereof, and the novel features will be particularly pointed out in connection with the appended claims.

In the accompanying drawings:

Fig. 1 is a side elevation of the rear end of a motorcycle, and coupled thereto a two-wheel trailer constructed in accordance with this invention;

Fig. 2 is a plan of the same;

Fig. 3 is a transverse sectional elevation through the trailer, the section being taken approximately along the line 3—3 of Fig. 2;

Fig. 4 is a sectional elevation through one of the resilient supports for the body of the trailer;

Fig. 5 is a sectional elevation through one of the spring suspensions for the forward end of the trailer body;

Fig. 6 is a partial, transverse sectional elevation through a trailer, also constructed in accordance with the invention but illustrating a modified form of spring suspension between the body and the frame, the section being taken approximately along the line 6—6 of Fig. 7;

Fig. 7 is a side elevation of part of the modified trailer illustrated in Fig. 6, to show further details of the modified suspension for the body;

Fig. 8 is a sectional elevation of the hitch or coupling, with the section taken approximately along the line 8—8 of Fig. 2, to illustrate one form of the construction for limiting tipping of the trailer relatively to the motorcycle; and Fig. 9 is a plan of the coupling shown in Fig. 8, but on a larger scale than in Fig. 2.

In the embodiment of the invention shown in Figs. 1 to 5, 8 and 9, the trailer is shown as attached to a motorcycle having a frame 1, a seat 2, a rear wheel 3, and exhaust pipe 4. The frame 1 is provided with a member 5 which extends from the rear wheel forwardly, and between the wheels depends to a relatively low point just sufficient to give the desired road clearance. The exhaust muffler 4 extends along one side of this frame, as shown in Fig. 2. This is a common type of motorcycle construction, and is not in itself a part of the invention. However, to the frame member 5 is secured a generally U-shaped frame member 6 which straddles, and extends forwardly past, the rear wheel 3, and at its forward end, the free ends of the arms of the U are secured to the frame 5 in any suitable manner such as by screws or bolts 7. That arm or side of the U of frame 6 which extends along the exhaust pipe 4, is bent as at 8 to clear the exhaust pipe, as shown clearly in Figs. 1 and 2. This frame 6, intermediate the ends of the arms of the U, is also supported by another frame member 9 which extends from the frame member 6, to which it is attached by clips 10, up over, and is secured to, an upper member of the frame of the motorcycle. This provides a relatively rigid support for the frame member 6 and sidewise pull on this frame member 6, when transmitted to the motorcycle frame, will exert a minimum tendency to tip the motorcycle sidewise.

The trailer is of the two-wheeled type and it includes a cross bar or frame member 11, Fig. 3, which has a generally horizontal central section, and both end portions extend upwardly from the ends of this central section to constitute upstanding arms 12, then generally in a direction horibontally away from one another as at 13, and then downwardly as at 14 to provide depending arms. The arms 12 and 14 with the cross part 13 provide what may be referred to as inverted U-shaped frame members with each arm 12 depending below the inverted U to a considerable extent. The cross or base parts 13 of the inverted U's are connected to one another by a tie rod 15. The central section of the rod 11, the upstanding arms 12, and the tie bar 15 together form a rigid, generally rectangular frame with an opening therethrough to receive the trailer body 16. A wheel 17 is received in the space between the arms 12 and 14 at each side of the frame, and the bearing shaft or spindle 18 of each wheel is supported at its ends by the adjacent arms 12 and 14 in any suitable manner, such as by clips 19, Figs. 1 and 2, secured to the arms 12 and 14 and extending rearwardly therefrom. Each of these clips 19 at its free end is provided with a slot 20, Fig. 1, into which the ends of the bearing shaft 18 may be slidingly received and clamped by suitable nuts 21, as usual in the mounting of bicycle wheels in bicycle frames. This makes it possible for one to remove the wheels 17 for the changing of tires or for repairs or other purposes.

The cross bar 11 may be formed of pipe and either bent from one piece into the desired shape, as shown in Fig. 6, or preferably, as shown in Fig. 3, the central section 22 is formed of a separate piece and at its ends welded to the lower or free ends of the arms 12 for a purpose which will appear shortly. The arms 12 are hollow, but intermediate of its ends, each arm 12 is provided with a slot 23 which extends in a direction endwise thereof. Disposed end to end within each arm 12, so as to extend in opposite directions from the slot 23, are two springs 24 and 25. The spring 24 is stronger than the spring 25, and at its lower end, engages against a loose shim 26, and the latter in turn rests against one end of a screw plug 27 which is threaded into the open lower end of the arm 12. Each spring 25 at its upper end abuts against one or more shims 28, the uppermost one of which in turn abuts against a pin 29 extending across the cavity of the pipe.

The body 16 is provided on each side with a projecting rod 30 which extends through the slot 23 in the adjacent arm 12 and within the arm 12 terminates in a flat head 31 which is received between the adjacent ends of the springs 24 and 25 in that arm 12. These springs 24 and 25, by their reaction on the head 31, tend to shift the rod 30 along the slot 23 into a central position in the central zone of the slot when the body 16 is in its normal position. By adjusting the screw plug 27 and by varying the thickness or number of the shims 26 and 28, the forces exerted by the springs 24 and 25 on the head can be varied. There is a small clearance between each vertical side face of the body 16 and the adjacent arm 12, so that the body 16 may rock or tip sidewise to a limited extent as the rods 30 may unequally move up and down in the arms 12. The weight of the load and of body 16 will cause the body to descend toward the central section 22 and carry the heads 31 of rods 30 downwardly, thereby compressing the springs 24. The springs 25 limit the rebound or upward movements of the body and thus act as rebound snubbers.

A draw bar 32 is secured at one end to the central section 22 of the cross frame member 11, and extends forwardly therefrom to a point beyond the forward end of the body 16. There it rises as at 33, and then extends forwardly as at 34, Figs. 1 and 2. The end 34 of the draw bar 32 at its free end is formed into an approximately half socket, and clamped to the end 34, such as by a bolt 35, is a second partial socket member 36, Figs. 1, 2 and 8.

The abutting faces of the socket members 34 and 36 are concave and receive between them a ball-like head 37 provided on the end a vertically disposed stud 38 which projects upwardly from the rear end of the frame 6 on the motorcycle, immediately in the rear of the rear wheel 3 of the motorcycle. The socket members 34 and 36, by their engagement with opposite sides of the head 37 form a universal hitch or coupling between the draw bar 32 and the frame member 6 on the motorcycle.

A cross frame member or bar 39, Figs. 1 and 2, is fixed to the draw bar 32 adjacent the forward end of the body 16 and the free ends of this cross bar 39 may be tied by brace rods or bars 40 to the draw bar 32. The brace rods 40 make acute angles with the length of the draw bar and serve to stiffen the cross bar 39. The brace bars 40 may extend beyond the cross bar 39 and at their ends carry upstanding rods 42, Figs. 1 and 5.

Each rod 42 extends upwardly into a cylinder 43 Fig. 5 carried by the forward end of the body 16, and at its upper end, within the cylinder 43, carries a head 44. A compression spring 45 is disposed between a tubular plug 46, adjustably secured in the lower end of the cylinder 43, and the head 44 so as to resist movement of the head 44 downwardly in cylinder 43. A spring 47 is also provided within the cylinder 43 between the head 44 and the upper end of the cylinder so as to resist upward movement of the head 44. Suitable shims 48 may be interposed between the upper end of each spring 47 and the upper end of the related cylinder 43, so as to adjustably vary the compression of the spring 47 and thus vary the resistance to descent of the forward end of the body 16. The tubular plug 46 may be adjusted in a direction endwise of the cylinder 43, such as by threading it into and out of the lower end of cylinder 43 to different extents so as to vary the compression of the spring 45 which snubs the rebound of the body 16. There are two of these resilient supports at the forward end of the body 16, one near each forward corner thereof. The cylinders 43 may be secured to the body 16 in any suitable manner, such as by clamps 49.

Brace bars 50 (Fig. 2) may also be attached to the draw bar 32 so as to extend at acute angles thereto in a rearward direction, and the free ends of these bars 50 are connected, such as by welding, to the cental section 22 of the cross frame bar 11. The cross frame bar 11, tie bar 15, the draw bar 32, the brace bars 40 and 50, and the cross bar 39 together form a trailer frame which is rollingly supported by the wheels 17, and which in turn resiliently supports the body 16. Suitable mudguards 51, Figs. 1 and 2, extend over the wheels 17 and each is secured to the under side of the adjacent cross part 13 of each U, between the arms of which the wheel 17 is received. The rear ends of the guards 51 may also be connected by rods 52 to the clips 19 which support the bearing shaft of that wheel, in the same manner that the rear ends of mudguards are supported from the wheel supporting frame in bicycles.

It will be noted that the body 16 extends through the opening in a generally rectangular frame formed by the arms 12, tie bar 15, and central horizontal section 22 of the cross frame member 11, and for some distance to the rear of the axes of rotation of the wheels as shown clearly in Figs. 1 and 2. The side walls of the body 16 may be made convergent at the rear end, so as to reduce wind drag on the same. The body 16 preferably has a width not greatly wider than the motorcycle frames and a height not greater than the motorcycle and rider, so that the body 16 will be protected to a considerable extent from wind resistance by the motorcycle and the rider thereon.

The section 22 of the cross frame member 11 is disposed at a level below the axes of rotation of the wheels 17 preferably more than half way to the ground from the wheel bearings 18 so that the body 16 of the trailer may be mounted low on the trailer frame, thereby providing a relatively low center of gravity for the entire trailer. This greatly increases its stability in travelling at high speeds over a highway, thereby reducing the danger of the trailer tipping over when one wheel thereof strikes obstructions or undulations on the highway.

Since the rods 30 which support the body 16 are disposed well above the bottom of the body, any tendency of the body to tip as the rods unequally move up and down on the springs 24, will be limited by engagement of the body with the arms 12 of the frame, and the actual horizontal, linear sidewise movement of the upper and lower edges of the vertical side walls of the body will be a minimum. In other words, if the rods 30 which support the body were entirely at the bottom of the body, the horizontal, sidewise, linear movement of the upper edges of the sides of the body 16 would be much greater and more space would be necessary between the sides of the body 16 and the arms 12 of the frame. By placing the rods 30 as closely as possible toward the mid-height of the body 16, the body 16 may be made wider and still obtain adequate provision for tipping of the body 16, which is desirable to give free spring suspension for the body.

It will be noted that the hitch or coupling between the draw bar 32 and the motorcycle frame member 6 permits relative up and down movements between the trailer frame and the motorcycle frame, such as are caused by the trailer and motorcycle moving in succession over undulations in the roadway. The coupling also permits relative horizontal swinging over a wide arc as the motorcycle turns or changes its direction of movement over a highway. The coupling also provides for relative tipping movements of the motorcycle and trailer, but it is desirable to limit the extent of such tipping movement to a safe extent, thereby preventing the trailer from tipping over if one of the wheels only should strike a rather pronounced bump in the road, while the trailer is moving at high speed.

For this purpose, the frame member 6 is provided with limit or auxiliary studs 53, Figs. 1, 2 and 8, on frame member 6 which extend upwardly at diametrically opposite sides of the coupling stud 38, but the studs 54 are preferably shorter than the coupling stud 38. The socket members 34 and 36 are provided with horizontal flanges 54 and 55 which extend over the studs 53, that is across the axes of those studs, but in positions spaced from the ends of the studs a substantial distance, as shown clearly in Fig. 8. It will be observed from Fig. 8, that the socket members 34 and 36 may rock from side to side considerably before either of the plates 54 and 55 strikes a limit stud 53, so that as the motorcycle and trailer travel along the highway each may rock or sway from side to side to a considerable extent independently of the other, but if such tipping of either one exceeds a certain safe extent of tipping, one of the flanges 54 and 55 will engage with a stud 53 and limit such relative movement, one of such limiting positions being shown by the dash lines in Fig. 8. The flanges 54 and 55 extend forwardly and rearwardly of the trailer to a substantial extent so that they will be effective to engage the limit studs 53, if necessary, during a considerable range of horizontal movement or swinging between the trailer and the motor cycle, such as would be caused when the motor cycle is changing its direction of travel or making a turn.

Referring now to the embodiment of the invention shown in Figs. 6 and 7, a modified suspension is provided between the body 16 and the trailer frame. In this embodiment of the invention, a leaf spring suspension is substituted for the coil spring supports of Figs. 1 to 5. Shackle members 56 are confined by collars 56a upon the central section 22 of the cross frame member 11 so as to swing thereon, and the free ends of these shackles are in turn hinged by pins 57 to ends of leaf springs 58. The other ends of the springs 58 are fixed to the body 16, as by fastening clips or lugs 60 secured on the bottom of the body. Similarly at the forward ends of the body 16, leaf springs 61 are attached, as by lugs 63 on the bottom of the body 16, the springs extending forwardly therefrom and being connected by pins 64 to shackle members 65, which in turn are hinged at 66 to bearings 67 on the ends of the cross bar 39. These springs 58 and 61 can be made and fastened to the body separately, or they can be formed by a single continuous spring strip, as shown. These springs are provided at each side of the body and they function in a manner similar to the action of the leaf springs at the opposite sides of an automobile in providing a spring support between the automobile body and the chassis. Other suspension means between the body and the trailer frame may be employed.

Attention is called to the fact that the trailer frame has approximately the same road clearance as the motorcycle frame (see Fig. 1) and that the trailer is coupled to the motorcycle frame at the lowest possible level so that any lateral pull on the motorcycle frame in drawing the trailer will not objectionably tend to tip the motorcycle. Since the trailer body 16 extends through the opening provided by the rear frame 11, the tie bar 15 will also act as an emergency limit stop for upward movement of the body in case the snubber springs fail to snub the upward movement of the body. By using the depressed central portion 22 of the frame, it is possible to lower the center of gravity of the vehicle body and its load to a very decided extent, which greatly increases the stability, against overturning, of the trailer, and the flanges 54 and 55, their cooperation with the studs 53, act as an additional safeguard for preventing tipping over of the trailer while being drawn.

It will be understood that various changes in the details and arrangements of parts, which have been herein described and illustrated in order to explain the nature of the invention, may be made by those skilled in the art within the principle and scope of the invention as expressed in the appended claims.

I claim:

1. A two wheeled trailer comprising a cross bar, having its central portion generally horizontal, and its end portions extending first upwardly from the central portion, then in directions away from one another, and then downwardly to form inverted, U-shaped ends, a tie bar connecting the base end portions of the U's, a frame member connected to said cross bar and extending forwardly and generally horizontally from said cross bar, said frame member, tie bar and cross bar together constituting a unit vehicle frame, a body disposed between said central portion of said cross bar and said tie bar and extending along and above said frame member, arms extending from the sides of said body adjacent the U ends of said cross bar, and means carried by said cross bar and engaged by said arms for resiliently supporting said body from said cross bar and also resiliently snubbing upthrow of said body, means for resiliently and separately supporting the forward end of said body from said frame member, a wheel disposed between the arms of each U of said cross bar, a bearing for rotatably supporting each wheel and connecting, and supported by, the side arms of the U of the cross bar which receives that wheel, and a trailer hitch at the end of said vehicle frame remote from said cross bar.

2. In a tractor and trailer combination, that improvement which comprises a trailer having a frame with a forwardly and generally horizontal coupling part, a tractor frame having a vertically disposed coupling part, one of said parts having a spherical head and the other of said parts having a split socket embracing and clamped to said head to provide a universal coupling connection between them, one of said parts also having vertically disposed studs on approximately diametrically opposed sides of said head, the other of said parts also having plates disposed to extend across the longitudinal axes of said studs and spaced from the ends of said studs when said trailer is in normal upright position relatively to said tractor frame, but engageable with said studs to limit the relative tipping of said trailer and tractor frames to a safe extent while offering no resistance to the universal relative movements of said head and socket caused by normal undulations in the roadway over which the trailer and tractor frames travel, and by changes in direction of travel of the travel and tractor frames.

3. A trailer comprising a pair of inverted U-shaped pipes disposed with the arms parallel and in approximately the same plane and spaced apart, with the inside arms of the U's, which are nearest one another, longer than the outside arms and depending below said other arms, said depending arms being connected at their lower ends by a cross member to form therewith a cross frame element, each of the inside arms of said U-shaped pipes, at a point intermediate of its ends, having a slot extending in a direction lengthwise thereof, a body disposed between said inside arms and having rods extending therefrom, and on opposite sides thereof, through said slots into said pipes, compression springs disposed in each of said inside arms and engaging opposite sides of said rod which enters that arm, whereby said body will be held against vertical movement in both directions by said sets of opposing springs, each of said inside arms having therein abutments against which said springs react.

4. A trailer comprising a pair of inverted U-shaped pipes disposed with the arms parallel and in approximately the same plane and spaced apart, with the inside arms of the U's which are nearest one another, longer than the outside arms and depending below said other arms, said depending arms being connected at their lower ends by a cross member to form therewith a cross frame element, each of the inside arms of said U-shaped pipes, at a point intermediate of its ends, having a slot extending in a direction lengthwise thereof, a body disposed between said inside arms and having rods extending therefrom and on opposite sides thereof, through said slots into said pipes, compression springs disposed in each of said inside arms and engaging said opposite sides of said rod which enters that arm, whereby said body will be held against vertical movement in both directions by said sets of opposing springs, each of said inside arms having therein abutments against which said springs react, each of said springs which resists downward movement of said body, being stronger than the upper spring which resists upward movement of said body.

5. A trailer construction comprising a rectangular frame with an arm extending outwardly and then downwardly from the upper corner of each side of said frame, a wheel disposed between each side of the rectangular frame and the adjacent downwardly extending arm, a bearing shaft for each wheel supported by the depending arm and the adjacent side of the frame and disposed intermediate the height of the frame with the bottom of the rectangular frame disposed more than approximately halfway from the axis of the bearing of the wheel towards the lowest part of the wheel, and a trailer body extending into the enclosure formed of the sides, top and bottom of said frame, and means carried by each vertical side of the frame for resiliently supporting the adjacent side of said body and including opposing springs for resisting movement of the adjacent side of the body vertically in both directions from a normal unloaded position of the body.

6. A trailer construction comprising an upright, loop-like frame, means attached to the upstanding sides of said frame intermediate their height and providing a rolling support for said frame, a body extending through the loop of said frame and supported by said frame, a bar attached to the bottom part of said frame and extending forwardly therefrom, a cross member carried by said bar adjacent the forward end of said body, brace members connecting said cross member to said bar and making with said bar an acute angle, brace members also connecting said bar to said bottom member of said frame and also making an acute angle with said bar, means connecting the forward end portion of said body to said cross frame member, the forward end of said bar being provided with a universal hitch for attachment to a tractor.

7. An improved tractor-trailer combination comprising a motorcycle with front and rear wheels and a frame connecting said wheels and having a portion depending between said wheels to a level at least approximately half way from the axes of rotation of said wheels to the surface on which said wheels roll, a hitch frame connected to said first frame at said level, a two-wheeled trailer having a frame, wheels on opposite sides of and supporting said trailer frame, a body extending forwardly from said trailer wheels and depending well below the axes of rotation of said trailer wheels, means supporting said body from said trailer frame, said trailer frame having a forwardly extending draw bar, and a universal coupling hitch between the forward end of said draw bar and said hitch frame, whereby the drag of said trailer will be applied to said motorcycle frame at said lowest level thereof and will exert a minimum force, tending to tip the motorcycle sideways.

8. A coupling device between a tractor and trailer which comprises a frame member on the tractor, a frame member on the trailer, one of said members having a vertically disposed stud terminating in a ball head, the other of said members having a split socket clamped to said head and confined thereto to provide a universal coupling between them, the sections of said split socket having flanges extending therefrom laterally of the normal direction of pull between the tractor and trailer, said one member having limit studs on opposite sides of said ball head and extending therefrom toward said flanges, but with their ends spaced from said flanges, when said trailer and tractor are in normal upright positions, a distance such that the limit studs will by engagement with said flanges limit the relative tipping of said trailer and tractor to a safe extent in all horizontally rotative positions at said ball and socket between said frame members.

9. A universal hitch between a motorcycle frame and a trailer frame, which comprises said frames, one of said frames having three vertically disposed studs arranged generally in a row, the central stud terminating at its free end in a ball-like head, a socket fitted to said head and carried by the other of said frames, said socket having flanges extending across the axes of the other studs but spaced from the ends of said other studs when the frames are in normal hauling relation, whereby, upon relative lateral tipping of said frames, the engagement of said flanges with said studs will limit the extent of such tipping to a safe extent.

10. A universal hitch between tractor and trailer frames, which comprises a stud member on one of said frames and terminating in a ball-like head, a socket member on the other of said frames and fitted to said head, plate-like means carried by one of said members, and limit means carried by the other of said members and engageable with said plate-like means to limit relative tipping of said frames laterally of the direction of pull at the coupling between said members to a safe angle, over a considerable range of horizontal and vertical relative movements between said members at said coupling.

11. A trailer construction comprising an upright loop-like frame, means attached to the upstanding sides of said frame intermediate of their height and providing a rolling support for said frame, a body extending through the loop of said frame and supported by said frame, means attached to the bottom part of said frame and extending approximately horizontally and forwardly therefrom, a cross member carried by said last named means adjacent the forward end of said body, means supporting the forward end portion of said body from said cross member, and coupling means carried by the forward end of said attached means, formed, at approximately the level of said bottom part, for connection to a tractor, and constituting a universal coupling to said tractor.

FRANK NEAL.